E. B. Forbush.
Harvester.
Nº 12,721. Patented Apr. 17, 1855.
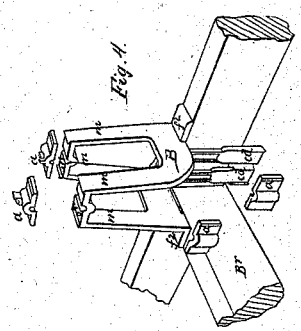
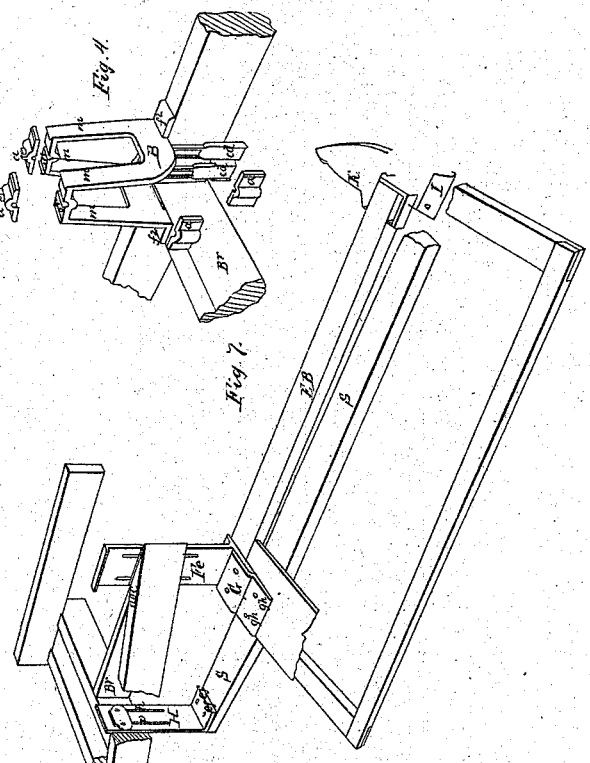
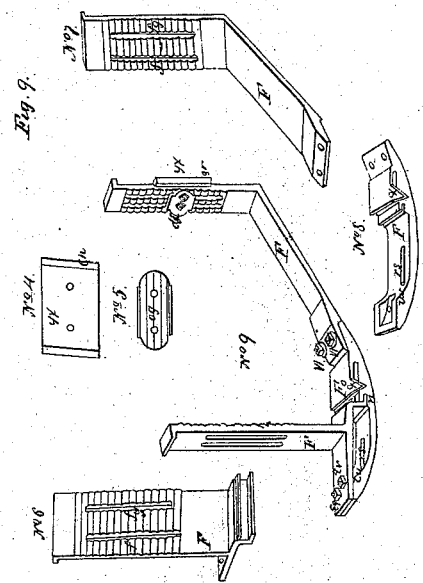
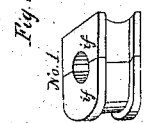
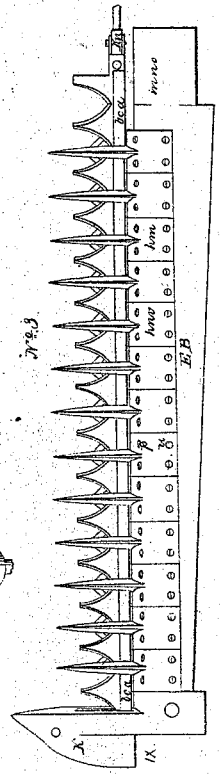
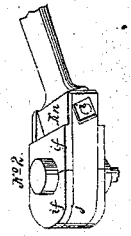

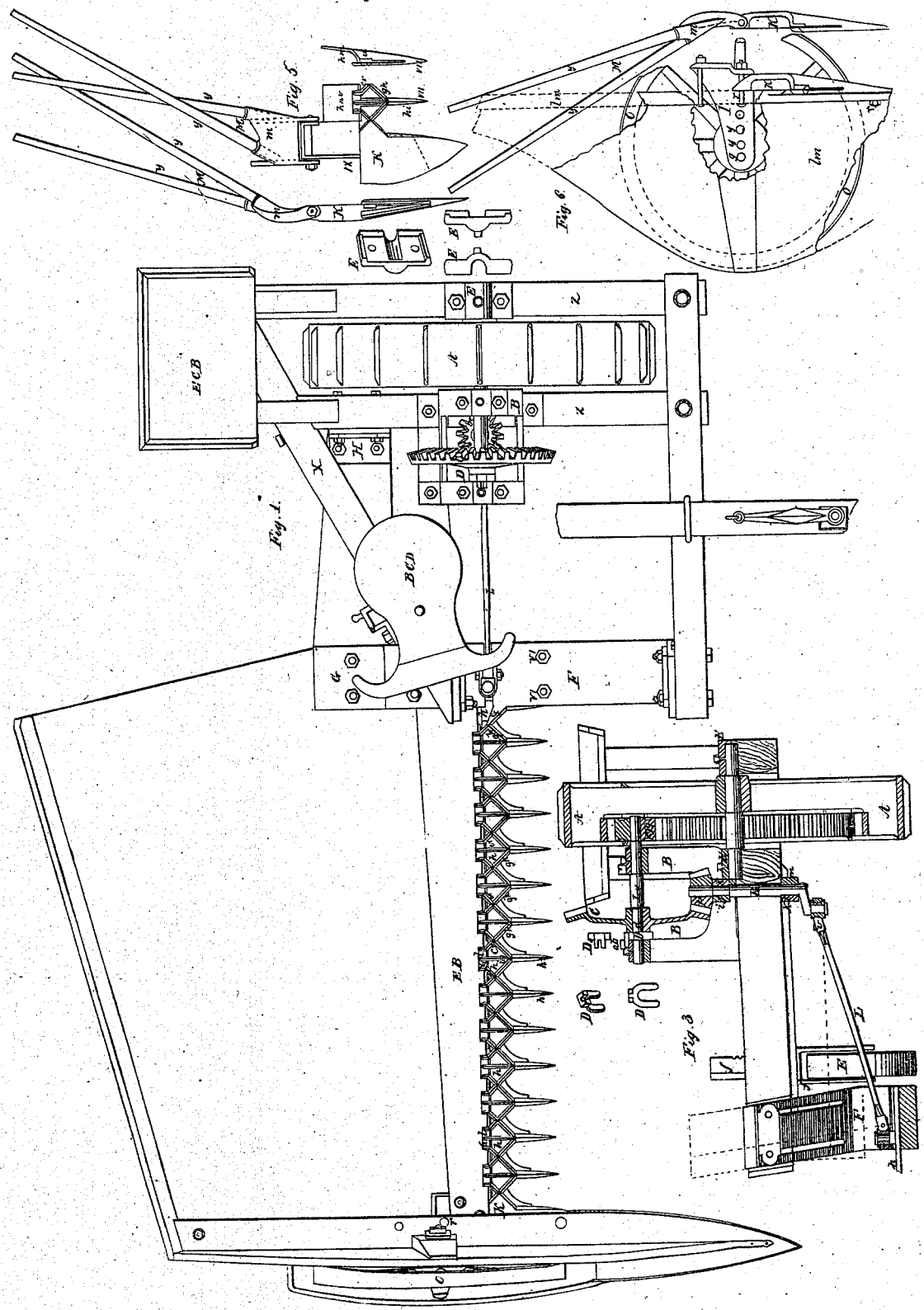
E. B. Forbush.
Harvester.
No. 12,721. Patented Apr. 17, 1855.

UNITED STATES PATENT OFFICE.

ELIAKIM B. FORBUSH, OF BUFFALO, NEW YORK.

IMPROVEMENT IN GRAIN AND GRASS HARVESTERS.

Specification forming part of Letters Patent No. 12,721, dated April 17, 1855.

*To all whom it may concern:*

Be it known that I, ELIAKIM B. FORBUSH, of the city of Buffalo, in the county of Erie and State of New York, have invented certain new and useful Improvements upon Grain and Grass Harvesting Machines; and I do hereby declare that the following is a full and exact description of said improvements, reference being had to the accompanying drawings and the letters of reference marked thereon.

The nature of my invention and improvements consists—

First. Of an improved form of frame for grain and grass harvesting-machines, which improvements are designed to accomplish the three following as the most important purposes: first, a side delivery of the grain in rear of the frame, the grain being raked off in nearly a direct line across the platform, while the cutting apparatus is sustained under or nearly under the axial line of the driving-wheel; second, to strengthen and brace the frame against the lateral and twisting strain of the finger-bar when cutting grass; third, the extension of the frame sufficient to meet the finger-bar and cutters at a convenient distance from the driving-wheel to connect the cutters to the crank-shaft by a connecting-rod of ordinary length, the finger-bar being made short to equal the length, or nearly so, of the cutter-bar.

Second. An improved pillow-block to support the gearing at or near the center of the driving-wheel and above the frame of the machine, with the crank-shaft standing in a perpendicular position and extending below the frame.

Third. An improved and new manner of constructing and connecting the grain-platform to the finger-bar and frame, so that the same finger-bar and cutters used for mowing grass may also be used for reaping grain, the construction and combination being such that the platform, finger-bar, and cutters may be raised and depressed together and sustained at the proper and different heights required for cutting grain.

Fourth. A new form of gear-key, in combination with the pillow-block and gearing for the purpose of holding the main bevel-wheel in or out of gear with the bevel-pinion on the crank-shaft.

Fifth. Several improvements upon the clamp patented to me on the 20th day of July, 1852, which improvements, in part, consist in making slots in the clamp, in the perpendicular parts thereof, where it connects with the frame of the machine, so that when it becomes necessary to change the height of the finger-bar and clamp the clamp can slide over the bolts through the slots, while the bolts remain stationary in the frame. The clamp is also ridged or corrugated crosswise from the slots, and washers are correspondingly corrugated, so that the bolts will draw the corrugated surfaces of the washers and clamp together, and thereby prevent the clamp from slipping when bolted to its proper place in the frame. The upper or clamping part, which locks in and is bolted to the runner and compresses the finger-bar, is also made to rise perpendicularly instead of obliquely, as heretofore, and meet the cross timber of the frame near the axial line of the driving-wheel, as hereinafter more fully set forth.

Sixth. An improvement or several improvements in the guard-finger patented to me on the 20th day of July, 1852, which improvements are hereinafter fully described.

Seventh. An improvement in the outside shoe, by which an opening and recess are made in the shoe and behind the blind-tooth, which works in the shoe to facilitate the discharge of the fine grass or other substance which may be drawn in to the shoe in the operation of the machine.

To enable others skilled in the art to make and use my invention, I will proceed to describe its construction and operation in the several particulars which I claim as my improvements.

The improvement in the frame consists principally in its form. The rear cross-timber, X, Fig. 1, instead of crossing the parallel bed-timbers Z and Z $e$ at right angles, as formerly, is brought in on an oblique angle sufficient to meet the line of the axle of the driving-wheel at about two feet nine inches from the plane of the driving-wheel. The parallel bed-timber Z is about four feet long, and Z $e$ is about four feet seven inches. The front cross-timber, X $y$, is about four feet two inches in length. The size of these timbers is four by five inches, and may be varied according to circumstances. A short brace-timber, B $r$, Fig. 7, is framed into the bed-timber Z at right angles thereto, and extends till it meets the timber X, and is bolted thereto. The timbers X and B $r$ are beveled at their intersections, corresponding to the angles on which they meet, so that their beveled faces come together, forming a good joint, as seen at $a\ b\ c$, Fig. 7. The parallel bed-timbers Z and Z $e$ are framed into the rear cross-timber, X, and also bolted to it by means of sunk nuts in Z and Z $e$ and bolts through X. The short brace-timber B $r$ is framed in and bolted to Z in the same manner. The front cross-timber, X $y$, is notched onto Z and Z $e$, and also bolted, as seen at $d\ d$, Fig. 1. By this arrangement and construction of the frame I obtain a frame which is conveniently adapted to the elevation and depression of the finger-bar and cutters by means of the clamp herein described. I also gain an extension of the timbers of the frame sufficient to meet and connect with the finger-bar and cutters at a suitable distance from the driving-wheel to connect the cutters to the crank-shaft by a connecting-rod of ordinary length, the finger-bar being made short to equal the length, or nearly so, of the cutter-bar. It also enables me to tie and bind the frame together by means of the clamp hereinafter described and the pole $b\ c\ d$, to which the horses are attached, the pole being bolted to the timbers X $y$ and B $r$ and between the driving-wheel and clamp. This arrangement also gives sufficient strength and permanence to the frame to resist the lateral and twisting strain of the finger-bar upon the frame and to counteract the side draft upon the horses. Another object of this position of the rear cross-timber, X, is to take the timbers of the frame out of the way of the grain and obtain room to rake off the grain at the side of the platform and in rear of the frame while a comparatively-narrow platform is used, and the finger-bar and cutters maintain a central position relatively to the driving-wheel. If the timber X should cross the parallel timbers Z and Z $e$ at right angles, as heretofore, or as represented in my patent of July 20, 1852, while the cutters maintained their position near the center of the driving-wheel, the timber would be in the way of the removal of the grain at the side, unless the platform were made much wider or of a circular form and the grain removed in a circular sweep across the platform; but with this improvement the timbers of the frame are taken out of the way of the grain and a comparatively narrow platform can be used. The cutters retain their central position and the grain removed in nearly a direct line across the platform and deposited on the ground in rear of the frame. It also enables me to work a self-raking apparatus in a direct line across the platform, instead of an arc of a circle, as in other machines, which raking apparatus will be described in another application. With the narrow platform and the cutters in their central position herein described, the machine is much better adapted to passing over uneven ground or to crossing the finishing or draining arrows in the plowed lands.

The pillow-block B is a cast-iron frame for the purpose of supporting the gearing above the frame of the machine, at the center of the driving-wheel, a perspective view of which is given in Fig. 4. It has three feet or bearings on the frame of the machine, (two of which are seen at $f\ t\ f\ t$,) through which it is bolted to the frame. It also has four pillars, $m\ m\ m\ m$, rising a sufficient height to bring the spur-pinion $e\ f\ g$ in gear with the cog-rim $g\ h\ i$ of the driving-wheel represented in Fig. 3. The pillow-block terminates in or supports two journal-boxes, $o\ n\ o\ n$, Fig. 4, for the shaft L $y$ of the spur-pinion $e\ f\ g$ and the bevel-wheel C, the bevel-wheel C being between these two journal boxes, as seen in Fig. 3. The shaft L $y$ can be moved lengthwise in these journal-boxes, so as to throw the bevel-wheel C in or out of gear with the bevel-pinion P of the crank-shaft. There is a space of about one inch in extent between the hub of the bevel-wheel C and the outside journal-box $o\ n$ when the wheel C is in gear, and the gear-key D $d$ just fills this space and holds the wheels in gear, as represented in Fig. 3. When the wheels are out of gear the same distance exists between the inside journal-box $o\ n$ and the shoulder on the shaft L $y$, so that the gear-key will fit in between the shoulder on the shaft L $y$ and the inside journal-box $o\ n$ and hold the wheels out of gear. Thus by moving the shaft lengthwise in the journal-boxes and alternating the gear-key from one place to the other the wheel C can be held in or out of gear, as desired.

The gear-key is a small smooth casting just large enough to set astride the shaft L $y$, and just thick enough to fill the space between the hub of the bevel-wheel C and the outside journal-box $o\ n$ when the wheels are in gear. It is represented in its place with the wheels in gear at D $d$, Fig. 3, and two separate views of it are given at D D, Fig. 3. It is held to its place by a projecting mortise on the key, as seen at D $o$, and a tenon on the journal-cap, as seen at $a\ b$, Fig. 3. The pillow-block also extends downward and across the timber Z, to which it is also bolted, and forms two bearings or journal-boxes for the crank-shaft, one of which is seen at $c\ d\ c\ d$, Fig. 4. The same bolts which pass through the journal $c\ d\ c\ d$ and its cap may also pass through the timber Z, and thus hold firmly against the timber. One foot (or one of the feet) of the pillow-block rests on and is bolted to the timber B $r$, and its other two feet rest on and are bolted to the timber Z.

The lower journal box or bearing of the crank-shaft, which is marked $c\ d\ c\ d$ in Fig. 4, is marked $k\ l\ m$ in Fig. 3, and the upper journal-box of the crank-shaft P $a$ is marked $i\ j\ k$ in Fig. 3. The crank-shaft P $a$ is thus sustained in a perpendicular position and at right angles to the bevel-wheel shaft L $y$. This arrangement enables the cutters to be worked nearly under the axial line of the driving-wheel, with the gearing all above the frame and out of the way of the dirt and gravel, while the gearing is connected to the cog-rim of the driving-wheel at the vertical center thereof. Sufficient strength must be given to the pillow-block to firmly support the gearing in this position while the machine performs its appropriate labor.

The main-platform-timber S S, Fig. 7, lies parallel with the finger-bar E B and extends farther inward toward the driving-wheel than the finger-bar, and connects with the main frame of the machine near the driving-wheel by means of the slotted hanger H. This casting or hanger has slots $p\ h$ to admit the platform to be raised and lowered with the clamp and finger-bar and correspond to the height thereof. There are also slots $e\ f\ e\ f$ at its connection with the platform-timber S S, through which it is bolted to the timber, and which will allow the timber to move inwardly equal to the distance required by the lateral angle on which the clamp is now raised and lowered. This extension and connection of the platform-timber S S to the main frame near the driving-wheel brings much of the weight of the platform upon the driving-wheel; and it also, being connected to the finger-bar, in a good degree prevents the finger-bar and knives from bending or springing when cutting grain.

The cast-iron plate G, Fig. 7, is bolted to the platform, as seen, $g\ h\ g\ h$, and this plate also reaches onto that part of the clamp which extends behind the upright part F $e$, and the same bolts which hold the upright part and the runner part of the clamp together to compress the finger-bar, as in a vise, also pass through the plate G when the platform is connected for reaping, so that the clamp also becomes an important support to the platform.

That part of the platform which is called the "divider," and is marked $l\ m$, Fig. 1, and $l\ m\ l\ m$, Fig. 6, is also bolted to the outside shoe, K, by two bolts, as seen at $r\ r$, Fig. 6. There is also a cast-iron standard connected with this part of the platform to strengthen the same and support the platform at its connection with the platform-wheel O. This standard is marked I in Figs. 6 and 7. This standard is bolted to the divider by the bolt $o\ p$. The bolt $r$ also passes through it and the outside shoe, K, as represented in Fig. 6. The other bolt $r$ also passes through the divider and the outside shoe. The bolts $r\ r$ are removed when the platform is detached from the finger-bar. The bolts which pass through the clamp and the plate G and the bolts which pass through the timber S S and the hanger H are also removed when the platform is detached from the finger-bar. The standard I has several holes through it, and also through the upright part of the divider, as seen in Fig. 6, $h\ p\ g$, to admit the axle of the platform-wheel O O, (which wheel supports the outer end of the platform,) in order to obtain different heights required for cutting grain. The platform is thus connected to the frame, finger-bar, and clamp, and the entire strength of the platform and finger-bar united and combined to resist the pressure and strain upon them when reaping.

The end of the connecting-rod L is made in the form of a segment of a circle, the center of the circle described by the segment (or arc) being the center of the bolt which passes through the end of the connecting-rod and the band $j$, which band incloses the coupling-boxes $i\ f\ i\ f$, that part of the coupling-box which comes in contact with the end of the connecting-rod being also made circular or concave, corresponding to the end of the connecting-rod, so that the end of the connecting-rod just fills the circular or concave surface of the coupling-box and allows the connecting-rod to be turned on its bolt as a center and bear equally against the coupling-box and hold it to its place at any angle upon which the connecting-rod may be worked. The connecting-rod is marked L in Fig. 3. It is again represented in Fig. 8, No. 2, in connection with the coupling-boxes $i\ f\ i\ f$, on a scale of one-half of full size, and the end thereof herein described is marked K $n$.

The improvements in the clamp are as follows: Slots are made in the perpendicular parts thereof where connected with the frame. These slots $f\ g\ f\ g$, Nos. 6 and 7, Fig. 9, are for the purpose of raising and depressing the clamp, and enable me to dispense with the cast-iron frame work for the same purpose represented in my patent of July 20, 1852. By means of these slots the clamp can slide over the bolts which bind it to the frame, while the bolts remain stationary in the frame. Ribs or corrugated surfaces are also made crosswise of the slots, as shown in Nos. 6 and 7, Fig. 9, and corresponding ribs or corrugated surfaces are also made on washers, as shown at $o\ g$, No. 5, Fig. 9, so that the bolts will draw the corrugated surfaces of the clamp and washers together, and thereby prevent the clamp from slipping when bolted to its proper place in the frame. The upright part of the clamp F $e$ locks into the foundation or runner part F $o$, as seen at $n$, Fig. 2, and also at $n$, No. 9, Fig. 9, and when the bolts $t\ r$ are made fast the finger-bar is held by compression, as in a vise, without bolts passing through the finger-bar. A slight rib is raised in the bottom of the runner F $o$, as seen at $r\ s$, Nos. 8 and 9, which rib becomes indented in the finger-bar, so as to prevent the finger-bar from slipping in the clamp, when in use, if by any cause the compression should become too slight to hold it securely. When the finger-bar is about to be put into the clamp for use the bolts $t\ r\ t\ r$, No. 9, Fig. 9, and the bolts which pass through the slots in the upright part must be loosened and the upright part F $e$ tipped forward to make room to enter the finger-bar to its place in the runner. The upright part F $e$ is then brought back to its place and bolted, wedging in and pressing upon the finger-bar and holding it firmly. That part of the finger-bar which is marked $m\ n\ o$, No. 3, Fig. 8, has its rear under edge rounded to correspond to the inner surface of the back part of the runner F $o$, which is also rounded, (see $t\text{-}n\ t\ n$, Nos. 8 and 9, Fig. 9,) so that when the upright part of the clamp is drawn to its place by the bolts $t\ r\ t\ r$ the finger bar is wedged in, compressed, and held securely to its place in the clamp.

At $y\,x$, No. 4, Fig. 9, is represented a guide-plate of cast-iron. This plate is made secure to the frame at the connections of the clamp to the frame by screws and bolts, and is for the purpose of guiding the clamp as it is moved up or down and preventing the clamp from swaying sidewise. There are projecting edges or flanges on these plates, which angle inward. The slotted parts of the clamp which slides over these plates and between these flanges are also correspondingly inclined inwardly. The object of this angle in the clamp and in the guide-plates is that when the clamp, and with it the finger-bar and cutters, are raised from their position for mowing to their position for reaping they will preserve the same distance, or nearly so, from the crank-shaft, so that the same connecting-rod will make the proper connection between the cutters and the crank-shaft without change in its length. There is a projecting finger on the front part of the clamp, as seen at &, No. 8, Fig. 9, which comes against the brace-bar of the guard-finger when the finger-bar is in its place in the clamp. (Represented at $g\,h$ &, Fig. 1.)

A perspective view of the several parts of the clamp is given in Fig. 9. No. 6 represents what is called the "upright" part, and is marked F $e$. No. 7 represents what is called the "front" part, and is marked F. No. 8 represents what is called the "foundation" or "runner" part, and is marked F $o$. No. 9 is a perspective view of all these parts combined and bolted together and forming as a whole what I herein call the "clamp." The front part is bolted to the foundation or runner part by two bolts, VI VI, and the upright part is bolted to the foundation or runner part by two bolts, $t\,r\,t\,r$. The guide-plates and clamp are connected to the timbers X, B $r$, and X $y$ at their projecting ends. The bottom or plate part of the guard-finger, which laps onto the finger-bar, is made four inches wide, or sufficiently wide so that when the guards are fastened onto the finger-bar they will form a shield or covering to the finger-bar, and give strength and stiffness to the finger bar, and protect it from wearing off as it slides over the ground in mowing.

A bottom view of the finger-bar, with a full set of guard-fingers fastened on by screws, together with the outside shoe, is given at No. 3, Fig. 8, and a top view of the same as connected with the clamp is seen in Fig. 1.

The top part of the guard-finger laps onto the finger-bar on its upper surface about one inch, as seen at Q $l$, Fig. 1, and this part is only half as wide as the bottom part, which shields the finger-bar from the ground. The guard-finger is fastened to the finger-bar upon the bottom or under side by two or more screws or bolts, as seen at $p\,n\,p\,n$, Fig. 8, No. 3.

The angular brace-bar $g\,h$, Fig. 1, is placed farther from the point of the guard than in my patent of July 20, 1852, and its angle is less acute, so that three-quarters or more of the grass or grain is cut against the straight part of the guard $h\,i$.

The angle and position of the brace-bar $g\,h$ is intended to be such that when the cutting-tooth passes through the guard an opening will be formed in the acute angle made by the brace-bar $g\,h$ and the middle bar, $i\,o$, so that the tooth or cutter will do a portion of its cutting on or against the middle bar, $i\,o$, and any obstruction of fine grass or other matter upon the cutter can also escape at this opening.

A second angle is also made in the brace-bar, as seen at $c\,r$, by which an opening is made behind the cutters and between the brace-bar $c\,r$ and the plate part of the guard. I call that part of the guard which comes in contact with the finger-bar the "plate" part. ($h\,m\,h\,m$, Fig. 5, and $h\,m\,h\,m$, Fig. 8, No. 3, represent this part.)

The apex of the angle formed by the brace-bar $g\,h$ and $c\,r$ is two inches, as near as may be, from the center of the middle bar, $i\,o$, so that a line drawn from one apex to its opposite is four inches in length, as near as may be. This makes the guards, when on the finger-bar, about four inches from center to center. The cutters should vibrate four inches and one-quarter in a direct line, so that each vibration will throw the cutters just past the center of the guard.

The open-work construction of the guards is designed to facilitate the escape of any fine grass, gum, or other matter which may chance to be drawn in between the cutters and the guards and prevent the cutters from choking or clogging. It also allows the brace-bars of the separate guards to come together, so that when a full set of guards are on the finger-bar they mutually brace and support each other, one of the outside guards bracing against the clamp and the other against the outside shoe, as seen in Fig. 1. The point of the guard projects about seven inches from the plate part, and the slot through which the cutters play is about five inches in length, more or less, and an eighth and sixteenth in width, more or less.

The cutters being riveted onto an iron or steel bar, called the "cutter-bar," ($b\,c\,a$, No. 3, Fig. 9,) which is one inch wide and one-fourth inch thick, the slot in the guard behind the cutting-edge of the knives must be sufficiently large to admit the cutter-bar, with the knives riveted on, and admit of its free play through the slots. This slot is represented at $t\,t$, Fig. 5.

A space about half an inch wide is left between the knives or cutters and the plate part of the guard to allow the fine grass, dirt, or other substance which may be deposited on the cutters to escape behind the cutters, and also to prevent friction between the cutter-bar and plate part of the guards. These guards may be cast on a "chill" or in the ordinary mode of casting.

The under front edge of the finger-bar is rounded off to correspond to the plate part of the guard, which is also rounded up, so that the guard will fit onto the finger-bar and slide over the ground, like a runner, when mowing.

The outside shoe, K, Figs. 5 and 8, is made with a recess and opening, as seen at *i x*. This recess and opening is for the purpose of permitting the fine grass, dirt, or other matter which may be drawn into the shoe in the operation of the machine to escape freely behind the blind-tooth which works in the shoe.

The accompanying drawings are on a scale of two inches to one foot, (except where otherwise mentioned,) which will give the size and proportion of each part herein described.

The whole machine may be constructed by ordinary and well-known methods of working wood and metals.

The driving-wheel is three feet two inches in diameter, and has sixty-nine driving-cogs in the cog-rim. The spur-pinion has thirteen cogs, the bevel-wheel forty-five cogs, and the bevel-pinion twelve cogs. This arrangement gives nearly forty (or thirty-nine and seventy-four one-hundredths) vibrations of the cutters to one revolution of the driving-wheel. At B C D, Fig. 1, is represented a seat for the raker, and at E C B is represented the driver's seat.

To the friction-wheel (represented in the drawings at E, Fig. 2) and the tracker (represented in Fig. 5 by letters *m* M *y*) I make no claim herein, they each being the subject of separate applications.

To the connecting-rod and coupling-boxes herein described I make no claim herein.

Having thus set forth my several improvements, what I claim therein as my invention, and desire to secure by Letters Patent, is—

1. The combination of the gear-key D with the gearing, substantially as set forth.

2. The extension of the platform-timber S S beyond the finger-bar, so as to connect it to the main frame of the machine near the driving-wheel, with the view of giving strength and stiffness to the platform and bring its weight as much as possible on the main frame near the driving-wheel, substantially as herein set forth.

3. As improvements upon the clamp, the locks *n* and *r s*, substantially as herein described.

4. The improvement of the second angle, *c r*, in the brace-bar of the guard-finger, substantially as herein described.

Buffalo, March 19, 1855.

ELIAKIM B. FORBUSH.

Witnesses:
C. W. SMITH,
A. B. SMITH.